UNITED STATES PATENT OFFICE.

WALTER EDWIN WINDSOR RICHARDS, OF SOUTHALL, ENGLAND.

MANUFACTURE OF MOLDED ARTICLES FROM CEMENT.

1,408,401.     Specification of Letters Patent.     Patented Feb. 28, 1922.

No Drawing.     Application filed November 29, 1918. Serial No. 264,622.

*To all whom it may concern:*

Be it known that I, WALTER EDWIN WINDSOR RICHARDS, a subject of the King of Great Britain and Ireland, residing at The Green, Southall, Middlesex, England, have invented certain new and useful Improvements in and Relating to the Manufacture of Molded Articles from Cement, of which the following is a specification.

This invention relates to improvements in the manufacture of molded articles from cement. The invention is particularly designed to enable articles of an irregular shape or of such shapes into the molds for which ordinary cement can only with difficulty be caused to flow, to be satisfactorily constructed, and it relates more particularly still, but not exclusively, to the manufacture of articles intended to be treated by a process of impregnation for the purpose of rendering them suitable for use as electric insulators, although the process which is the subject of the present invention, will be found to be applicable to other purposes besides the one referred to.

In the manufacture of the class of articles referred to, it is usual to make a molded article either of cement alone or of cement with the addition of asbestos or like fibre, and subsequently treat this article with an impregnating material, and the finished article, particularly if it is to be used for the purpose of electric insulation, should be capable of taking a fine polish, being screw threaded and otherwise worked to fit the particular circumstances under which it is to be used. Difficulties have been experienced in molding some of these articles, particularly in cases where the mold is of irregular shape, or, for instance, where it contains flanges or other interstices, the reason being that the mixture, particularly if the cement has been mixed with asbestos fibre, is very difficult to cause to flow, and it is found that it frequently does not completely fill the mold, the pressure being taken locally.

Now the object of the present invention is to overcome this difficulty and to provide means for making the mixture flow more easily, so that molded articles of irregular shape or which contain interstices or the like can more easily be manufactured than heretofore, without such means damaging the properties of the finished article.

The invention consists in the use of clay as an admixture to ground Portland or like cement for the purpose of causing the cement either with or without the addition of asbestos fibre to flow more easily into the interstices in the molds.

It has previously been proposed to mix puzzuolana or clay with unground cement clinker and subsequently grind the mixture to cement, the object being to produce a cement particularly suitable for ferro-concrete work or for structures which have to withstand the action of sea water. The present invention differs from this process in that it relates to a cement to be used for making articles by a pressure molding operation, and has no relation to any uses connected with ferro-concrete or building operation; furthermore the clay, which is used only for the purpose of increasing the flowing properties of the cement is added to ordinary already ground cement.

The invention is carried out as follows:—

In giving a detailed description of the method of carrying out the process, it should be understood that this is given by way of an example of the preferred process, and one which will yield satisfactory results for ordinary articles, but it is not desired to limit the invention to the precise details of quantities or other minor routine details that are given. The cement used should preferably be ordinary Portland cement, preferably not too quick setting. A mixture is made containing 30 parts of Portland cement, 15 parts of waste asbestos fibre and 10 parts of clay. The clay used may be china clay, ball clay or even ordinary clay or fire-clay and it should preferably be dried and powdered. These ingredients are thoroughly mixed in any suitable mixing machine and the mixture is stored in a bin or other suitable receptacle, from which it can conveniently be drawn.

25 to 30 lbs. of this mixture are found to be a convenient quantity for a charge for making the molding composition, and this amount of mixture is thoroughly mixed in a suitable machine with three quarts of water. This wet mixture is then used for the purpose of molding the desired articles by any known or convenient method.

The molding should preferably be carried out before the initial set of the cement has taken place, as it will be found that better results are obtained in this way, it being well known that cement, although it will set in time, requires a long time to do so if it is disturbed after the initial set has taken place, and the resulting articles are likely to be less satisfactory in the latter case. This fact is the reason why it is desirable, if possible, not to use quick setting cement.

Whatever method of molding is adopted, the process should be accompanied by a certain amount of pressure, the pressure being sufficient to remove any excess of water, and leave an article of sufficient strength for it to be capable of withstanding careful handling.

The molded articles are then stored, preferably in racks open to the air for varying periods according to their thickness. They are then placed into a cold or warm oven and gradually heated to a temperature of about 300 to 400 degrees Fahr. for a period of about 24 hours. If the articles are intended to be impregnated, they are then put into the impregnating vessels and treated in the ordinary way. It should be noted that if it is desired to use the process which is the subject of this invention for making extruded tubes, the mixture will require to be varied, less asbestos or none at all being used in this case. The proportions for making tubes may be equal amounts of clay and cement. Suitable methods of and materials for impregnating the articles made are described in the specification of British Letters Patent No. 3364 of 1915, corresponding Letters Patent of the U. S. and No. 1,267,696 of May 28, 1918, granted to me.

As has been stated, the above details are given by way of example and constitute the ordinary working process suitable for most articles, but the invention is not limited to such details. For example, mixtures of different clays may be used and the proportions of the ingredients may also be varied within reasonable limits.

Further is has been found that in some cases glass wool may with advantage be used instead of asbestos.

Mixtures made in accordance with this invention will be found to flow under pressure far more easily than has hitherto been found to be the case.

It may be found that the crushing or tensile strengths to which molded articles made in accordance with this invention can be subjected without breaking, will be less than those to which articles made without the addition of clay can be subjected, and it should be noted that the invention is primarily, but not exclusively, intended to be used for the manufacture of such articles as are not required to withstand very high stresses.

It should further be noted that the addition of clay to the mixture causes the article to be capable of taking an even finer polish than is the case where clay is not used, the articles at the same time being quite suitable for being worked or fitted with screw threads.

I claim:

1. The method of making molded cement articles which consists in adding powdered clay up to ten parts to a mixture of from thirty to forty-five parts of ground cement and fiber, and mixing the same therewith, then mixing the resultant composition with water to form a freely flowing mixture, molding the desired article under pressure.

2. A composition of matter consisting of 30 parts of ground Portland cement, 15 parts of waste asbestos fiber, 10 parts of dry powdered clay as and for the purpose described.

In testimony whereof I affix my signature in presence of two witnesses.

WALTER EDWIN WINDSOR RICHARDS.

Witnesses:
 FRANK B. DEHN,
 G. P. YOUNG.